United States Patent
Kim et al.

(10) Patent No.: US 10,993,242 B1
(45) Date of Patent: Apr. 27, 2021

(54) DYNAMIC ANTENNA CALIBRATION SCHEDULING

(71) Applicant: Sprint Communications Company L.P., Overland Park, KS (US)

(72) Inventors: Yun Sung Kim, Ashburn, VA (US); Jason Sigg, Overland Park, KS (US); Sanghoon Sung, Ashburn, VA (US); Pinal Tailor, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/538,316

(22) Filed: Aug. 12, 2019

(51) Int. Cl.
*H04W 72/08* (2009.01)
*H04W 52/24* (2009.01)
*H04L 5/00* (2006.01)

(52) U.S. Cl.
CPC ......... *H04W 72/082* (2013.01); *H04L 5/0023* (2013.01); *H04W 52/243* (2013.01)

(58) Field of Classification Search
CPC .. H04W 72/082; H04W 52/243; H04L 5/0023
See application file for complete search history.

(56) References Cited

U.S. PATENT DOCUMENTS

| 10,608,678 | B1* | 3/2020 | Hormis | H04L 5/14 |
| 2008/0198775 | A1* | 8/2008 | Nejatian | H04W 52/52 370/280 |
| 2011/0255577 | A1* | 10/2011 | Agee | H04L 27/2607 375/219 |

FOREIGN PATENT DOCUMENTS

| CN | 102244531 A | * | 11/2011 |
| CN | 103139884 A | * | 6/2013 |
| CN | 103546205 B | * | 4/2016 |

* cited by examiner

*Primary Examiner* — Phirin Sam
*Assistant Examiner* — Louis Samara

(57) ABSTRACT

Methods and systems are provided for dynamic performance of antenna calibration. To ensure channel reciprocity of downlink and uplink channels, antenna calibration must be performed with some degree of regularity. The present disclosure includes systems and methods for performing antenna calibration, wherein noise levels are determined at various subframes of wireless telecommunication frame structures as a basis for determining when the calibration signal should be transmitted in an OFDM symbol. Utilizing the disclosed systems and methods yields preferred antenna calibration, avoiding gain degradations caused by decreases in propagation performance.

20 Claims, 4 Drawing Sheets

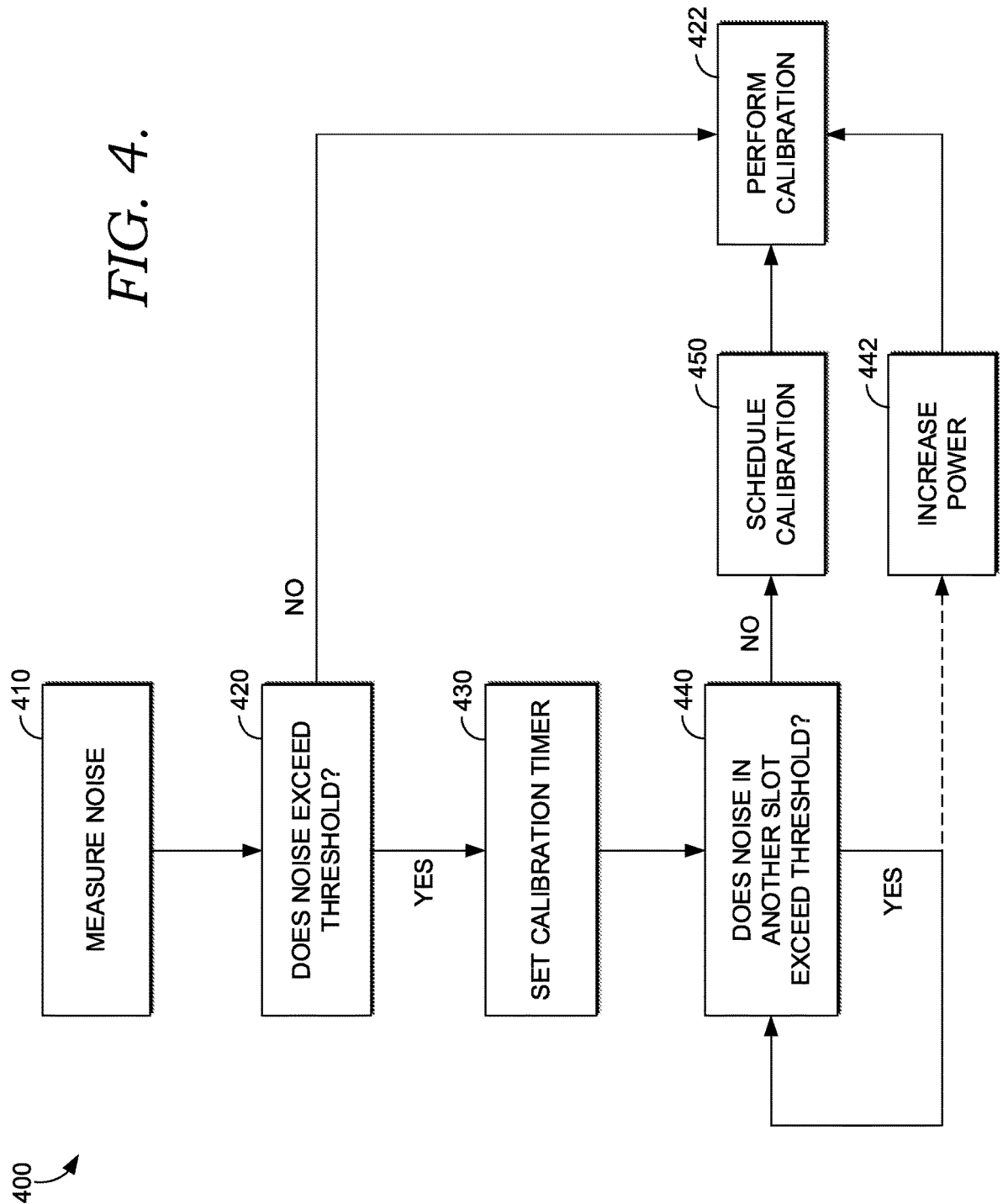

DYNAMIC ANTENNA CALIBRATION SCHEDULING

SUMMARY

The present disclosure is directed, in part, to systems and methods for dynamic scheduling and performance of antenna calibration, substantially as shown in and/or described in connection with at least one of the figures, and as set forth more completely in the claims.

In aspects set forth herein, antenna calibration may be dynamically scheduled and performed in various subframes of a wireless telecommunication, based on measured noise during the various subframes. When functioning properly, a base station may use channel estimation techniques to determine channel state information for a propagated downlink channel based on information known about a received uplink channel. Antenna calibration is used to ensure that the uplink channel can be accurately estimated based on the uplink channel. When antenna calibration is not performed, or ineffectively performed (e.g., due to the existence of excessive received noise during the calibration period), the antenna system may suffer from degradations in gain, beamforming performance, and the like. Accordingly, aspects of the present disclosure are directed to dynamic scheduling and performance of antenna calibration in various subframes, based on measured noise in the various subframes.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 4 illustrates an exemplary method for dynamically scheduling and performing antenna calibration in accordance with implementations of the present disclosure.

DETAILED DESCRIPTION

Figure 1:
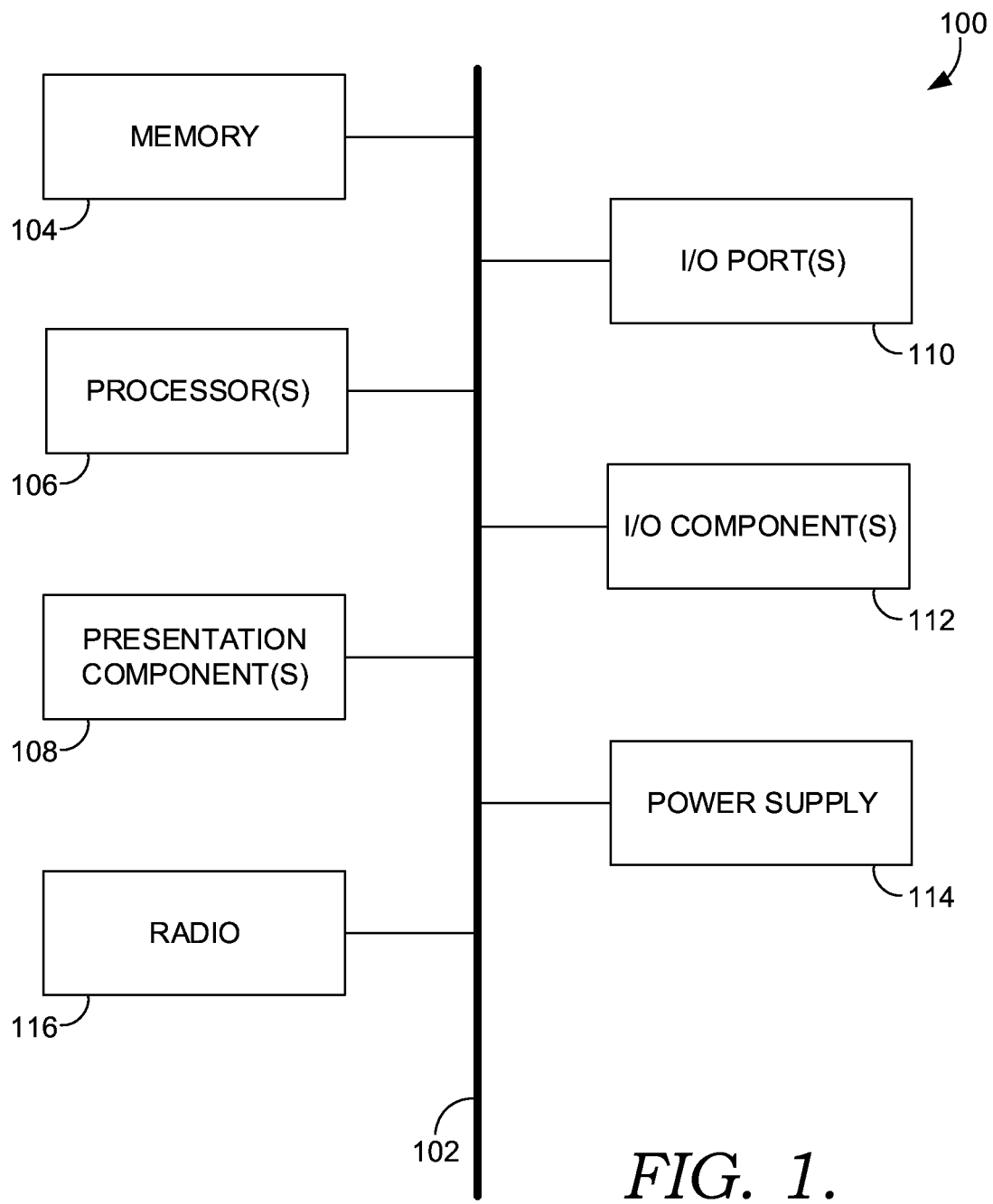
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of some of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 30th Edition (2016).

Embodiments of the present disclosure may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, nodes) to provide network coverage to a plurality of UEs within a predetermined area (e.g., a cell, or a cell sector). These base stations are employed to transmit a set of signals to UEs wishing to communicate with the network. Many factors can affect the ability of the base station to perform as intended. Many wireless telecommunications networks employ channel estimation techniques in order to estimate a downlink channel (i.e., a frequency-specific communication path between an access point (e.g., a base station) and a UE) based on information received by the access point from the UE in the uplink channel (i.e., a frequency-specific communication path between the UE and the access point). In aspects, both the uplink and downlink channels may be said to be divided into at least two discrete channels, wherein each of the uplink and downlink channels comprises a channel between the antenna system and a UE (referred to herein as an "external downlink/uplink channel") as well as a channel between the antenna system the access point (referred to herein as an "internal downlink/uplink channel").

In many wireless telecommunication systems, it is necessary to perform a method of antenna calibration, referred to herein to describe a process of determining one or more of the internal downlink channel and the internal uplink channel, in aspects combined with determining the external uplink channel based on one or more signals received from a UE, in order that the total downlink channel may be estimated. Conventionally, antenna calibration may be performed by transmitting a calibration signal in an OFDM symbol in the guard period special subframe of wireless telecommunication protocol frame structures. By transmitting the calibration signal from the access point to the antenna system, channel information of the internal downlink channel, specifically, may be determined. In some instances, the downlink channel, as a function of the internal and external downlink channels, may be incorrectly estimated if antenna calibration is not performed or performed ineffectively. Ineffective antenna calibration may be attributable to, in some aspects, an inability of the antenna system to effectively receive and/or identify the calibration signal due to relatively high noise levels received at the antenna system, whether from external sources (e.g., UEs, other access points, environmental interference, and the like) or internal sources. Improper or failed antenna calibration can result in losses in RF gain, degraded beamforming performance, decreased throughput, and other undesirable effects.

Accordingly, it is important for network effectiveness and the user experience that antenna systems are effectively and routinely calibrated. In accordance with embodiments described herein, a first noise level is determined during a first time period, as experienced by an antenna array (as used herein, the term "antenna array" may be used to refer to a plurality of antenna elements, arranged in a particular manner, or as few as a single antenna element). A second noise level is also determined during a second time period, as experienced by the antenna array. By comparing the first and second noise levels to a predetermined threshold, one or more components of the wireless network can determine when to perform the antenna calibration procedure and how much power to use to transmit the calibration signal from the access point to the antenna array.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1.

Accordingly, in a first aspect of the present disclosure, an embodiment is directed to a system for performing antenna calibration, the system comprising an antenna array and at least one computer processing component. The at least one computer processing component is configured to determine, based on listening at the antenna array, a first noise level during a first time period, such as a guard period, and to determine a second noise level during a second time period, such as an uplink pilot time slot. The at least one computer processing component may then perform, or instruct an access point to perform, an antenna calibration procedure using a first power level during a third time period, if the first noise level does not exceed a predetermined threshold, wherein the antenna calibration operation comprises communicating a calibration signal to each antenna of the antenna array. If the first noise level exceeds the predetermined threshold and the second noise level does not exceed the predetermined threshold, the at least one computer processing component may perform, or instruct an access point to perform, the antenna calibration procedure using the first power during a fourth time period. If both the first noise level and the second noise level, the at least one computer processing component may delay, or instruct the access point to delay, the performance of the antenna calibration procedure to a later time period, or the power used to transmit the calibration signal may be increased and communicated in either the third or fourth time period.

In a second aspect of the present disclosure, an embodiment is directed to a method for calibrating an antenna system. The method includes determining, based on listening at the antenna array, a first noise level during a first time period and to determine a second noise level during a second time period. An antenna calibration procedure is performed using a first power level during a third time period if the first noise level does not exceed a predetermined threshold. If the first noise level exceeds the predetermined threshold and the second noise level does not exceed the predetermined threshold, the antenna calibration procedure is performed using the first power during a fourth time period. If both the first noise level and the second noise level, the antenna calibration procedure is performed in a later time period, or the power used to transmit the calibration signal may be increased and communicated in either the third or fourth time period.

In a third aspect, an embodiment is directed to a non-transitory computer storage media storing computer-usable instructions that, when used by one or more processors, cause the one or more processors to perform a method for calibrating an antenna. The method includes determining, based on listening at the antenna array, a first noise level during a first time period and to determine a second noise level during a second time period. An antenna calibration procedure is performed using a first power level during a third time period if the first noise level does not exceed a predetermined threshold. If the first noise level exceeds the predetermined threshold and the second noise level does not exceed the predetermined threshold, the antenna calibration procedure is performed using the first power during a fourth time period. If both the first noise level and the second noise level, the antenna calibration procedure is performed in a later time period, or the power used to transmit the calibration signal may be increased and communicated in either the third or fourth time period.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
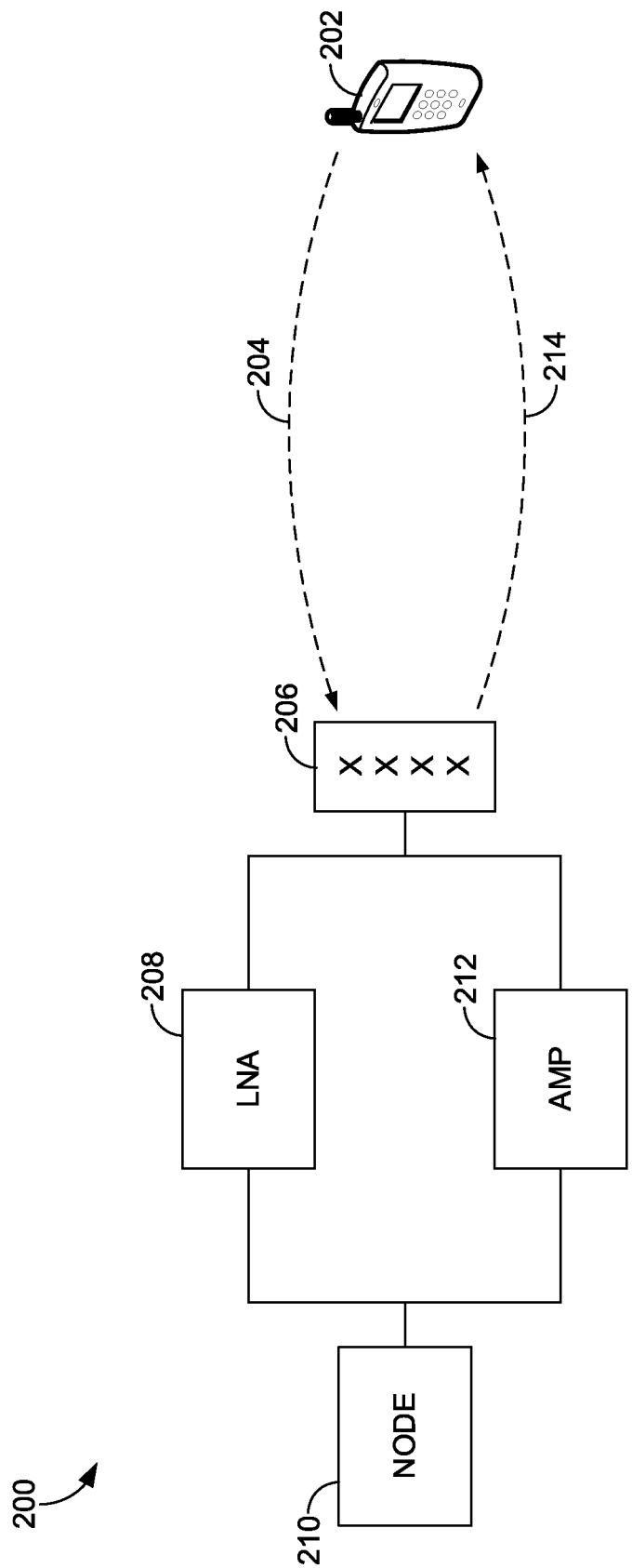
FIG. 2 illustrates an exemplary system suitable for use in implementing aspects of the present disclosure.

FIG. 2 illustrates an exemplary system suitable for use in implementing aspects of the present disclosure. Such an exemplary system is designated generally as system 200. The system 200 may be said to comprise at least one UE 202, an antenna system 206, a first amplifier 208, an access point 210, and a second amplifier 212. The system 200 may be generally said to receive an uplink signal 204 from the UE 202 to the antenna system 206 and to communicate a downlink signal 214 from the antenna system 206 to the UE 202. As discussed herein, an antenna calibration procedure may be performed by the system 200 in order that the downlink channel, including the channel used to communicate the downlink signal 214 to the UE 202, may be estimated based on the theory of channel reciprocity.

The antenna system 206 may comprise as few as one antenna or it may comprise a plurality of antenna elements arranged to form an antenna array, such as an array that comprises 4, 8, 32, 64, or 128 individual elements. In aspects, the antenna system may comprise at least a first antenna element and a second antenna element, wherein the first antenna element is a transmit element and the second antenna element is a receive element. In other aspects, the first antenna element may be a first transmit element and the second antenna element may be a second transmit element. The antenna system 206 may comprise any combination of transmit and receive antenna elements; for example, in some aspects, the antenna system may be said to comprise 64 antennas, wherein each antenna consists of a transmit element and a receive element.

The access point 210 provides an interface between the wirelessly connected UE 202 and a network. In aspects, the calibration scheduling described herein may be performed by one or more computer processing components of the access point or communicatively coupled to the access point. In other aspects, the calibration scheduling described herein may be performed by a computer processing component remote to the system 200, wherein the remote computer processing component provides one or more instructions to the access point 210 to perform the antenna calibration procedure at a particular time and/or using a particular transmit power. The access point 210 may also be referred to as a base station or node, and may comprise a NodeB (e.g., a node used to communicate according to the 3G wireless protocol), eNodeB (e.g., a node used to communicate according to the 4G and/or LTE wireless protocols), gNodeB (e.g., a node used to communicate according to a 5G wireless protocol), or the like.

An exemplary antenna calibration procedure that may be performed as part of the present disclosure may comprise determining the internal uplink channel and the external uplink channel based on the uplink signal 204, (e.g., a pilot signal, sounding reference signal, or the like) received at the antenna system 206 from the UE 202. The external uplink channel may be generally understood to be channel state information relating to the manner in which an RF signal is propagated from the UE 202 to the antenna system 206. The internal uplink channel may be generally understood to be channel state information or channel/impulse response of the uplink signal 204 as it is communicated from the antenna system 206 to the access point 210, via the first amplifier 208. In aspects, the first amplifier 208 may be a low noise amplifier. Subsequent to determining the total uplink channel, a calibration signal may be communicated from the access point 210 to the antenna system 206 via a second amplifier 212. Knowing the total uplink channel state information and the internal downlink channel state information, the system 200, can more accurately predict how the downlink signal 214 will be propagated by the antenna system 206 in the downlink channel and ensure that channel reciprocity is maintained.

In aspects of the present disclosure, the system 200 may dynamically schedule and/or perform an antenna calibration procedure, such as the one described above, based on observed noise in a particular time period. Wireless communication protocols may be generally said to communicate information according to a particular frame structure, wherein the frame structure comprises various frames, subframes, and subframe components, which govern what type of information is communicated by a particular system component at a particular time. For example, the 4G/LTE frame structure includes a guard period special subframe, wherein the access point 210 has ceased transmitting the downlink signal 214 and the UE 202 has yet to initiate transmission of the uplink signal 204. In aspects, the guard period special subframe may be generally understood to provide an amount of time for the entirety of the downlink signal 214 to be received by the UE 202 before the UE 202 begins transmitting the uplink signal 204. In aspects, the guard period special subframe may comprise at least three discrete component time periods: the uplink pilot time slot, the guard period, and the uplink pilot time slot.

The system 200 may determine a first noise level in a first time period, wherein the first time period is associated with a particular frame, subframe, or subframe component. In a non-limiting example, the first time period may be said to be the guard period component of the guard period special subframe. Accordingly, the system 200 may measure the noise received at the antenna system 206 during the first time period and determine a first noise level, such as a signal to interference noise ratio (SINR) (e.g., a ratio between a signal, such as the uplink signal 204 or the calibration signal, and observed noise), received noise power, or the like. In some aspects, if the first noise level does not exceed a predetermined threshold in the first time period, the system 200 may perform an antenna calibration during a subsequent time period having the same frame, subframe, or subframe component identifier as the first time period. For example, if the first time period is a first guard period, the subsequent time period may be a second or later guard period, relative to the first guard period.

If the first noise level exceeds the predetermined threshold, the system 200 may measure the noise received at the antenna system 206 during a second time period and determine a second noise level. In some aspects, if the first noise level exceeds the predetermined threshold but the second noise level does not exceed the predetermined threshold, the system 200 may perform an antenna calibration procedure during a subsequent time period having the same frame, subframe, or subframe component identifier as the second time period. For example, if the first time period is the guard period, the second time period may be a first uplink pilot time slot, and the subsequent time period may be a second or later uplink pilot time slot, relative to the first uplink pilot time slot.

If both the first noise level and the second noise level exceed a threshold, the system 200 may, in aspects, delay calibration and/or increase the calibration signal power. That is, in one aspect, if both the first noise level and the second noise level exceed the predetermined threshold, the system 200 may initiate a calibration timer. In such an aspect, the system 200 may wait until the calibration timer reaches a predetermined calibration time period, which may be as little as 1 second or as much as 1 hour, or more (e.g., 1 second, 1 minute, 5 minutes, 30 minutes, or 1 hour) before determining the first noise level for a fifth time period having the same frame, subframe, or subframe component identifier as the first time period and determining the second noise level for a sixth time period having the same frame, subframe, or subframe component identifier as the second time period.

In yet other aspects, if both the first noise level and the second noise level exceed the predetermined threshold, the system 200 may increase the power of the calibration signal with or without delaying calibration by the predetermined calibration time period. For example, in some aspects, upon determining that both the first noise level and the second noise level exceed the predetermined threshold, the system 200 may either immediately perform the antenna calibration procedure by transmitting the calibration signal at a higher transmit power (i.e., increasing the SINR), or the system 200 may increase the transmit power of the calibration signal and determine if the increased transmit power was sufficient to increase the SINR above the predetermined threshold. If the system performs a noise level test using the increased transmit power, the system 200 may iteratively repeat the power increase and noise level test until the SINR exceeds the predetermined threshold during either the first time period or the second time period and then perform the antenna calibration procedure at a subsequent time period having the same frame, subframe, or subframe component identifier as the first time period or the second time period, respectively.

Figure 3:
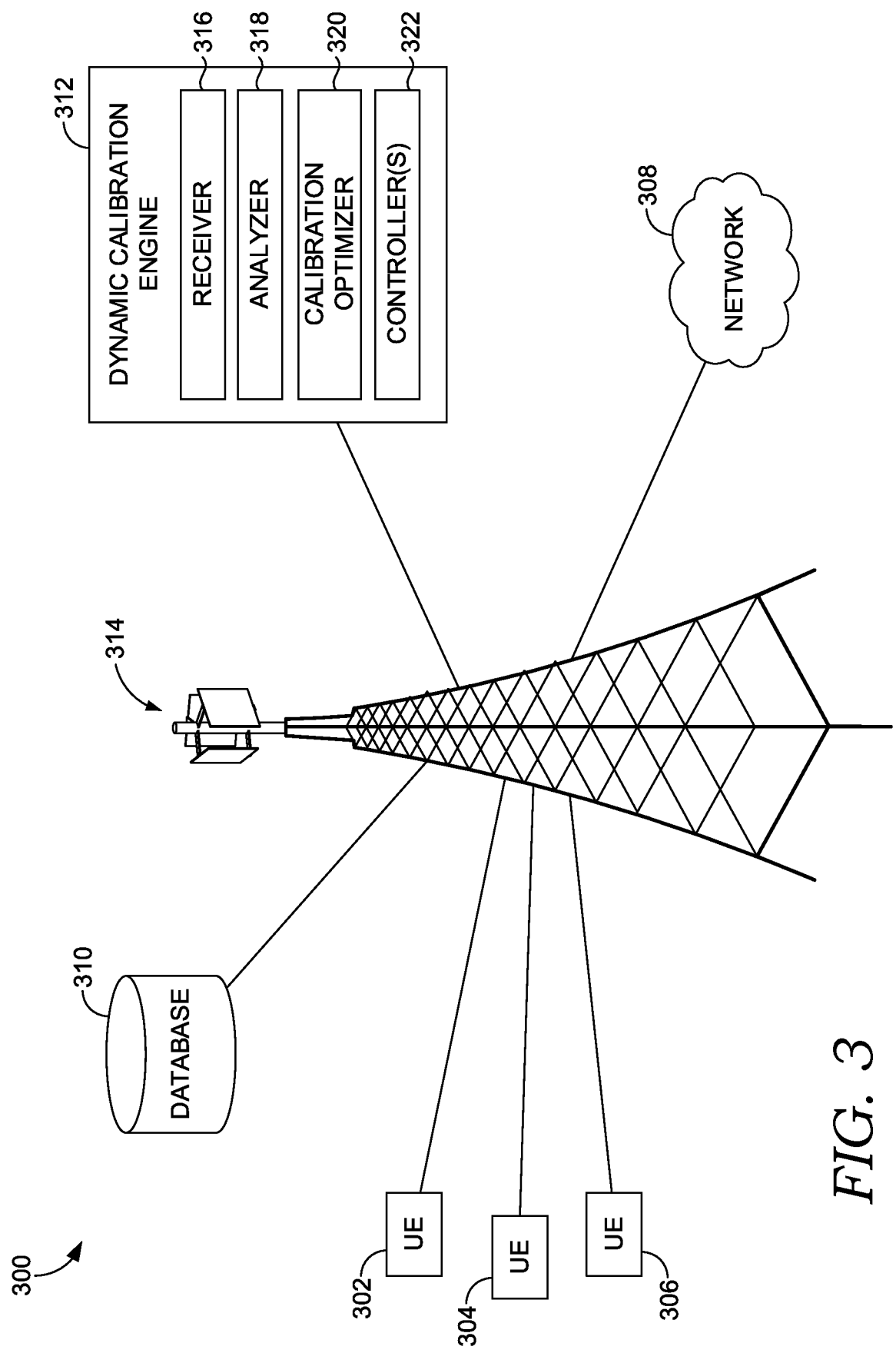
FIG. 3 illustrates an exemplary network environment suitable for use in implementations of the present disclosure.

FIG. 3 provides an exemplary network environment in which implementations of the present disclosure may be employed. Such a network environment is illustrated and designated generally as network environment 300. Network environment 300 is but one example of a suitable network environment and is not intended to suggest any limitation as to the scope of use or functionality of the invention. Neither should the network environment be interpreted as having any dependency or requirement relating to any one or combination of components illustrated.

Network environment 300 includes user devices (items 302, 304, and 306), access point 314, network 308, database 310, and dynamic beamforming engine 312, any one or more of which, together, may comprise the system 200 of FIG. 2, of which network environment 300 may be said to comprise, in aspects. In network environment 300, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a access point 314 in order to interact with a public or private network.

In some aspects, the user devices (items 302, 304, and 306) can correspond to computing device 100 in FIG. 1.

Thus, a user device can include, for example, a display(s), a power source(s) (e.g., a battery), a data store(s), a speaker(s), memory, a buffer(s), a radio(s) and the like. In some implementations, a user device (items 302, 304, and 306) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 302, 304, and 306) in network environment 300 can optionally utilize network 308 to communicate with other computing devices (e.g., a mobile device(s), a server(s), a personal computer(s), etc.) through access point 314. The network 308 may be a telecommunications network(s), or a portion thereof. A telecommunications network might include an array of devices or components (e.g., one or more base stations), some of which are not shown. Those devices or components may form network environments similar to what is shown in FIG. 3, and may also perform methods in accordance with the present disclosure. Components such as terminals, links, and nodes (as well as other components) can provide connectivity in various implementations. Network 308 can include multiple networks, as well as being a network of networks, but is shown in more simple form so as to not obscure other aspects of the present disclosure.

Network 308 can be part of a telecommunication network that connects subscribers to their immediate service provider. In some instances, network 308 can be associated with a telecommunications provider that provides services (e.g., LTE) to user devices, such as user devices 302, 304, and 306. For example, network 308 may provide voice, SMS, and/or data services to user devices or corresponding users that are registered or subscribed to utilize the services provided by a telecommunications provider. Network 308 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 314 is configured to communicate with user devices, such as user devices 302, 304, and 306 that are located within the geographical area, or cell, covered by access point 314. Accordingly, access point 314 may include one or more base stations, base transmitter stations, radios, antennas, antenna arrays, power amplifiers, transmitters/receivers, digital signal processors, control electronics, GPS equipment, and the like. For example, the access point 314 may comprise a wireless communication node (e.g., eNodeB, gNodeB, and the like) configured to utilize a MIMO antenna array (e.g., an array having 64 transmit elements and 64 receive elements) to communicate a wireless downlink signal to one or more UEs according to one or more communication protocols (e.g., 4G, 5G, or the like).

As shown, access point 314 is in communication with dynamic calibration engine 312, which comprises various components that are utilized, in various implementations, to perform one or more methods for dynamically scheduling and/or performing antenna calibration. The dynamic beamforming engine 312 may comprise components including a receiver 316, an analyzer 318, a calibration optimizer 320, and one or more controllers 322. However, in other implementations, more or less components than those shown in FIG. 3 may be utilized to carry out aspects of the invention described herein. The dynamic calibration engine 312 may be a discrete component, physically collocated with, near to, or distant from the access point 314 but communicatively coupled thereto. In other aspects, the dynamic calibration engine 312 may be a component or process of the access point 314, such as an eNodeB, which is communicatively coupled to an antenna system, such as the antenna system 206 of FIG. 2.

The receiver 316 of the dynamic beamforming engine 312 can, among other things, receive an uplink signal or information characterizing the uplink signal, such as the uplink signal 204 of FIG. 2. In one aspect, the receiver 316 may receive uplink channel information from one or more UEs or derive uplink channel information from one or more characteristics of an uplink signal transmitted to the access point 314 by the one or more UEs (e.g., a pilot signal, sounding reference signal, or the like). The receiver 316 may also be configured to listen and determine a noise level in one or more time periods. In aspects, the receiver may configured to determine a noise level based on noise external to the access point 314 and/or based on noise internal to the access point 314. Uplink channel information and/or noise level information may be communicated from the receiver 316 to the analyzer 318.

The analyzer 318 can, among other things, use received noise level information to determine a noise level and compare it to a predetermined threshold according to the method described with respect to FIG. 2. The analyzer 318 may additionally be configured to estimate or determine the internal uplink channel response based on the received uplink channel information and known total uplink channel state. The analyzer may be further configured to communicate the determined noise level relative to the predetermined threshold and the internal uplink channel response to the calibration optimizer 320.

The calibration optimizer 320 can, among other things, utilize information from the analyzer 318 to determine when and/or at what power antenna calibration should occur, as described in detail with respect to FIG. 2. Using the previously-described processes, the calibration optimizer 320 may, in various aspects, determine: that antenna calibration should occur at a third time period due to a first noise level in a first time period not exceeding a predetermined threshold; that antenna calibration should occur at a fourth time period due to a second noise level in a second time period not exceeding the predetermined threshold after the also determining that the first noise level did exceed the predetermined threshold; that antenna calibration should be suspended for a predetermined calibration time period; or that the access point 314 should increase a transmit power of the calibration signal in a particular and subsequent frame, subframe, or subframe component.

In aspects where the dynamic calibration engine 312 is a component of the access point 314, the controller 322 may control the actual transmission of signals from the access point 314 and may thus transmit a calibration signal at a time and power level determined by the calibration optimizer 320. In aspects where the dynamic calibration engine 312 is remote from the access point 314, the controller 322 may provide calibration instructions to the access point 314, wherein the calibration instructions include a calibration power and/or a calibration time when the access point 314 should perform the antenna calibration procedure.

Turning now to FIG. 4, a flow diagram is illustrated of an exemplary method 400 for dynamically performing and/or scheduling antenna calibration, in accordance with implementations of the present disclosure.

Initially at block 410, a first noise level in a first time period is measured and/or determined based on information available to a wireless communication system, such as the system 200 of FIG. 2 as a component of the network environment 300 of FIG. 3. The first noise level measured or determined at block 410 may take the form of a received noise level (i.e., an observed noise, in dB), a SINR (i.e., a ratio between observed noise and a particular signal, such as an uplink signal from a UE or a calibration signal from an access point). The first level, determined at block 410 is compared to a predetermined threshold at block 420.

If the first noise level is determined not to exceed the threshold at block 420, the method proceeds to block 422, wherein antenna calibration is performed. In aspects, the process of block 422 may be the actual performance/execution of an antenna calibration procedure, or it may be an instruction to an access point or other component to perform the antenna calibration procedure. If the first noise level is determined to exceed the threshold at block 420, the method 400 proceeds to block 430.

At block 430, a calibration timer may be initiated based on the first noise level exceeding the predetermined threshold. It may be generally preferred that antenna calibration occur in a frame, subframe, or subframe component corresponding to the first time period (e.g., the guard period subcomponent of the guard period special subframe). Accordingly, if the first noise level exceeds the threshold, it may be desirable for a wireless telecommunication system to set a calibration timer for an amount of time different than a standard calibration frequency. For example, it may be desirable to set a calibration timer to be less than the standard calibration frequency if it is more desirable to return calibration to the frame, subframe, or subframe component corresponding to the first time period. In other aspects, it may be desirable to increase the calibration timer; this may be relevant if traffic at a particular access point is not as susceptible to service interruptions that may occur from a less-frequently-calibrated antenna. In yet other aspects, the calibration timer may be set for the standard calibration frequency.

At block 440, a second noise level is compared to the predetermined threshold. In some aspects of method 400, the second noise level a second time period may additionally be measured and/or determined at block 440. In other aspects, the second noise level may be proactively measured and/or determined as part of block 410. Regardless of when the second noise level is measure and/or determined, the second time period may correspond to a frame, subframe, or subframe component different that the frame, subframe, of subframe component that corresponds to the first time period. For example, if the first time period is the guard period subcomponent of the guard period special subframe, the second time period may be an uplink pilot time slot or a downlink pilot time slot, or any other frame, subframe, or subframe component of the relevant frame structure.

If the second noise level is determined to exceed the predetermined threshold at block 440, the method 400 may continue to measure/determine noise levels at additional time periods in order to determine if a particular noise level in a particular time period does not exceed the predetermined threshold. In some aspects, if every available or acceptable time period has been tested, the method 400 may proceed to block 442. At block 442, the method 400 increases the power of the calibration signal that is transmitted to antenna system, such as the antenna system 206 of FIG. 2. By increasing the transmit power of the calibration signal, the SINR may be improved, increasing the likelihood that the antenna system will be properly or more accurately calibrated. Once it has been determined that the transmit power of the calibration signal should be increased, the calibration signal may be transmitted as part of the calibration performance of block 422 (whether in the frame, subframe, or subframe component corresponding to the first time period, second time period, or any other tested time period).

If the second (or subsequently tested) noise level is determined not to exceed the predetermined threshold at block 440, the method proceeds to block 450, wherein the antenna calibration procedure is scheduled at the frame, subframe, or subframe component corresponding to the time period in which the noise level was measured and/or determined not to exceed the predetermined threshold. For example, if the second noise level is measured and/or determined to not exceed the threshold and the second time period corresponds to the upload pilot time slot component of the guard period special sub frame, the procedure of block 450 will schedule the antenna calibration procedure to occur at the next or any other subsequently occurring upload pilot time slot component of the guard period special subframe. Once the calibration is scheduled, the antenna calibration procedure is performed at block 422.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A wireless telecommunication system for performing antenna calibration, the system comprising:
an antenna array comprising a first antenna and a second antenna; and
a computer processing component configured to:
determine, based on listening at the antenna array, a first noise level during a first guard period;
determine, based on listening at the antenna array, a second noise level during a first uplink pilot time slot;
if the first noise level does not exceed a calibration noise threshold, perform an antenna calibration operation using a first power level during a second guard period, the second guard period being subsequent to the first guard period, wherein the antenna calibration operation comprises communicating an internal pilot signal with each of the first antenna and the second antenna;
if the first noise level exceeds the calibration noise threshold and the second noise level does not exceed the calibration noise threshold, perform the antenna calibration operation using the first power level during a second uplink pilot time slot, the second uplink pilot time slot being subsequent to the first uplink pilot time slot;
if each of the first noise level and the second noise level exceeds the calibration noise threshold, perform the antenna calibration operation using a second power level during the second guard period, the second power level being greater than the first power level.

2. The system of claim 1, wherein the first antenna is a first transmit antenna and the second antenna is a second transmit antenna.

3. The system of claim 1, wherein the first antenna consists of a first transmit antenna element and a first receive antenna element and the second antenna consists of a second transmit antenna element and a second receive antenna element.

4. The system of claim 1, wherein the computer processing component is an eNodeB.

5. The system of claim 1, wherein the computer processing component is configured to communicate with one or more UEs according to the 5G protocol.

6. The system of claim 1, wherein the antenna array comprises 64 antennas.

7. The system of claim 1, wherein an internal uplink channel is communicated from an antenna of the antenna array to the computer processing component via a low noise amplifier.

8. The system of claim 7, wherein the internal downlink channel is communicated from the computer processing component to an antenna of the antenna array via an amplifier, the amplifier being different than the low noise amplifier.

9. The system of claim 1, wherein the calibration noise threshold comprises a signal to interference noise ratio, wherein the signal is the internal pilot signal.

10. The system of claim 1, wherein if each of the first and second noise levels exceed the calibration noise threshold, and prior to performing the antenna calibration operation using the second level, the computer processing component is further configured to:
not perform the antenna calibration operation for a calibration time period;
following the expiration of the calibration time period, determine, based on listening at the antenna array, a third noise level during the second guard period;
determine, based on listening at the antenna array, a fourth noise level during the second uplink pilot time slot;
if the third noise level does not exceed the calibration noise threshold, perform an antenna calibration operation using a first power level during a third guard period, the third guard period being subsequent to the second guard period;
if the third noise level exceeds the calibration noise threshold and the fourth noise level does not exceed the calibration noise threshold, perform the antenna calibration operation using the first power level during a third uplink pilot time slot, the third uplink pilot time slot being subsequent to the second uplink pilot time slot; and
if each of the third noise level and the fourth noise level exceeds the calibration noise threshold, perform the antenna calibration operation using a second power level during the third guard period.

11. The system of claim 10, wherein the calibration time period is 30 minutes.

12. A method for calibrating an antenna system, the method comprising:
determining, based on listening at an antenna array, a first noise level during a first guard period, the antenna array comprising a first antenna and a second antenna;
determining, based on listening at the antenna array, a second noise level during a first uplink pilot time slot;

if the first noise level does not exceed a calibration noise threshold, performing an antenna calibration operation using a first power level during a second guard period, the second guard period being subsequent to the first guard period, wherein the antenna calibration operation comprises communicating an internal pilot signal with each of the first antenna and the second antenna;

if the first noise level exceeds the calibration noise threshold and the second noise level does not exceed the calibration noise threshold, performing the antenna calibration operation using the first power level during a second uplink pilot time slot, the second uplink pilot time slot being subsequent to the first uplink pilot time slot;

if each of the first noise level and the second noise level exceeds the calibration noise threshold, performing the antenna calibration operation using a second power level during the second guard period, the second power level being greater than the first power level.

13. The method of claim 12, wherein an internal uplink channel is communicated from an antenna of the antenna array to a computer processing component via a low noise amplifier.

14. The method of claim 13, wherein the internal downlink channel is communicated from the computer processing component to an antenna of the antenna array via an amplifier, the amplifier being different than the low noise amplifier.

15. The method of claim 12, wherein if each of the first and second noise levels exceed the calibration noise threshold, and prior to performing the antenna calibration operation using the second level, the method further comprises:
   not performing the antenna calibration operation for a calibration time period;
   following the expiration of the calibration time period, determine, based on listening at the antenna array, a third noise level during the second guard period;
   determining, based on listening at the antenna array, a fourth noise level during the second uplink pilot time slot;
   if the third noise level does not exceed the calibration noise threshold, performing an antenna calibration operation using a first power level during a third guard period, the third guard period being subsequent to the second guard period;
   if the third noise level exceeds the calibration noise threshold and the fourth noise level does not exceed the calibration noise threshold, performing the antenna calibration operation using the first power level during a third uplink pilot time slot, the third uplink pilot time slot being subsequent to the second uplink pilot time slot; and
   if each of the third noise level and the fourth noise level exceeds the calibration noise threshold, performing the antenna calibration operation using a second power level during the third guard period.

16. The method of claim 15, wherein the calibration time period is 30 minutes.

17. The method of claim 15, wherein the calibration time period is inversely correlated with a calibration trigger frequency, the calibration trigger frequency being a number of times that the internal uplink channel is different than an internal downlink channel during a predetermined time.

18. A non-transitory computer storage media storing computer-usable instructions that, when used by one or more processors, cause the one or more processors to:
   determine, based on listening at an antenna array, a first noise level during a first guard period;
   determine, based on listening at the antenna array, a second noise level during a first uplink pilot time slot;
   if the first noise level does not exceed a calibration noise threshold, perform an antenna calibration operation using a first power level during a second guard period, the second guard period being subsequent to the first guard period, wherein the antenna calibration operation comprises communicating an internal pilot signal with each of the first antenna and the second antenna;
   if the first noise level exceeds the calibration noise threshold and the second noise level does not exceed the calibration noise threshold, perform the antenna calibration operation using the first power level during a second uplink pilot time slot, the second uplink pilot time slot being subsequent to the first uplink pilot time slot; and
   if each of the first noise level and the second noise level exceeds the calibration noise threshold, perform the antenna calibration operation using a second power level during the second guard period, the second power level being greater than the first power level.

19. The non-transitory computer storage media of claim 18, wherein if each of the first and second noise levels exceed the calibration noise threshold, and prior to performing the antenna calibration operation using the second level, the processor is further configured to:
   not perform the antenna calibration operation for a calibration time period;
   following the expiration of the calibration time period, determine, based on listening at the antenna array, a third noise level during the second guard period;
   determine, based on listening at the antenna array, a fourth noise level during the second uplink pilot time slot;
   if the third noise level does not exceed the calibration noise threshold, perform an antenna calibration operation using a first power level during a third guard period, the third guard period being subsequent to the second guard period;
   if the third noise level exceeds the calibration noise threshold and the fourth noise level does not exceed the calibration noise threshold, perform the antenna calibration operation using the first power level during a third uplink pilot time slot, the third uplink pilot time slot being subsequent to the second uplink pilot time slot; and
   if each of the third noise level and the fourth noise level exceeds the calibration noise threshold, perform the antenna calibration operation using a second power level during the third guard period.

20. The non-transitory computer storage media of claim 19, wherein the calibration time period is inversely correlated with a calibration trigger frequency the calibration trigger frequency being a number of times that the internal uplink channel is different than an internal downlink channel during a predetermined time.

* * * * *